US011204761B2

(12) United States Patent
Bathen et al.

(10) Patent No.: US 11,204,761 B2
(45) Date of Patent: Dec. 21, 2021

(54) DATA CENTER INCLUDING COGNITIVE AGENTS AND RELATED METHODS

(71) Applicant: INTERNATIONAL BUSINESS MACHINES CORPORATION, Armonk, NY (US)

(72) Inventors: Luis A. Bathen, Placentia, CA (US); Simon-Pierre Genot, San Jose, CA (US); Mu Qiao, Belmont, CA (US); Ramani Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/207,503

(22) Filed: Dec. 3, 2018

(65) Prior Publication Data
US 2020/0174784 A1    Jun. 4, 2020

(51) Int. Cl.
| | | |
|---|---|---|
| G06N 3/08 | (2006.01) | |
| G06F 9/50 | (2006.01) | |
| G06F 11/30 | (2006.01) | |
| G06F 8/71 | (2018.01) | |

(52) U.S. Cl.
CPC ............. *G06F 8/71* (2013.01); *G06F 9/5083* (2013.01); *G06F 11/3003* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,260,893 B1* | 9/2012 | Bandhole | G06F 9/5083 709/221 |
| 8,370,490 B2 | 2/2013 | Deng et al. | |
| 8,468,041 B1 | 6/2013 | Vengerov | |
| 9,363,190 B2 | 6/2016 | Beloglazov et al. | |
| 9,443,196 B1 | 9/2016 | Jain et al. | |
| 9,613,080 B1 | 4/2017 | Kowalski | |
| 9,668,699 B2 | 6/2017 | Georgescu et al. | |
| 10,289,438 B2* | 5/2019 | Frye, Jr. | G06F 8/65 |
| 10,558,483 B2* | 2/2020 | Balma | G06F 9/5077 |
| 10,817,606 B1* | 10/2020 | Vincent | G06F 21/566 |
| 2011/0077795 A1* | 3/2011 | VanGilder | G06F 1/329 700/300 |
| 2011/0153507 A1* | 6/2011 | Murthy | G06F 9/5061 705/304 |

(Continued)

OTHER PUBLICATIONS

Guo et al.; "Coordinated VM Resizing and Server Tuning: Throughput, Power Efficiency and Scalability;" 2012 IEEE 20th International Symposium on Modeling, Analysis and Simulation of Computerand Telecommunication Systems; pp. 289-297.

(Continued)

*Primary Examiner* — Jason D Mitchell
(74) *Attorney, Agent, or Firm* — Sherman IP LLP; Kenneth L. Sherman; Hemavathy Perumal

(57) ABSTRACT

A data center may include a software defined infrastructure in a computing environment. The data center may also include a computer readable medium having instructions which when executed by a processor cause the processor to implement cognitive agents to perform adaptive deep reinforcement learning to reconfigure the software defined infrastructure based upon changes in the computing environment.

19 Claims, 5 Drawing Sheets

(56) References Cited

U.S. PATENT DOCUMENTS

| | | | | |
|---|---|---|---|---|
| 2012/0209573 | A1* | 8/2012 | Karrat | G06F 30/00 703/1 |
| 2012/0303923 | A1* | 11/2012 | Behera | G06F 9/455 711/170 |
| 2016/0092787 | A1 | 3/2016 | Gadde et al. | |
| 2016/0147552 | A1* | 5/2016 | Zhang | G06F 9/5066 718/1 |
| 2016/0306679 | A1* | 10/2016 | Mendoza | G06F 9/5083 |
| 2017/0024643 | A1 | 1/2017 | Lillicrap et al. | |
| 2017/0032245 | A1 | 2/2017 | Osband et al. | |
| 2017/0039105 | A1 | 2/2017 | Shivanna et al. | |
| 2017/0126516 | A1 | 5/2017 | Tiagi et al. | |
| 2017/0154261 | A1 | 6/2017 | Sunehag | |
| 2017/0262433 | A1* | 9/2017 | Chester | G06N 3/0454 |
| 2018/0246762 | A1* | 8/2018 | Tarsa | G06F 9/5083 |
| 2018/0287902 | A1* | 10/2018 | Chitalia | H04L 43/045 |
| 2018/0293498 | A1* | 10/2018 | Campos | G06F 8/38 |
| 2018/0314555 | A1* | 11/2018 | Auvenshine | G06F 9/5011 |
| 2019/0087253 | A1* | 3/2019 | Li | G06F 11/076 |
| 2019/0138934 | A1* | 5/2019 | Prakash | G06K 9/6257 |
| 2019/0140918 | A1* | 5/2019 | Xu | H04L 67/2842 |
| 2019/0302310 | A1* | 10/2019 | Fox | G01V 11/002 |
| 2019/0340459 | A1* | 11/2019 | Faibish | G06N 20/00 |
| 2019/0347547 | A1* | 11/2019 | Ebstyne | G06T 17/00 |
| 2020/0050178 | A1* | 2/2020 | Gao | G05B 19/4155 |
| 2020/0099592 | A1* | 3/2020 | Mahindru | G06F 16/1734 |
| 2020/0111038 | A1* | 4/2020 | Ward | G06F 16/353 |

OTHER PUBLICATIONS

Mnih et al.; "Human-level control through deep reinforcement learning;" Research Letter; Macmillian Publishers Limited; Feb. 26, 2015; vol. 518; pp. 529-541.

Piyush B. Masrani; "Server Virtualization;" Department of Computer Science and Engineering Indian Institute of Technology, Bombay Mumbai; 26 pages.

Duc Tang Tri Nguyen; "Supervised and Reinforcement Learning for Fighting Game AIs using Deep Convolutional Neural Network;" Japan Advanced Institute of Science and Technology; Thesis or Dissertation; Mar. 2017; 57 pages.

Handlin et al.; "Using a Total Cost of Ownership (TCO) Model for Your Datacenter;" Industry Perspectives; DataCenter Knowledge; https://www.datacenterknowledge.com/print/106950; Oct. 1, 2013, pp. 1-6.

IBM; "An architectural blueprint for autonomic computing;" White Paper; Jun. 2005; Third Edition; pp. 1-34.

Gerald Tesauro, "Reinforcement Learning in Autonomic Computing: A Manifesto and Case Studies;" IEEE Internet Computing vol. 11 no. undefined; Jan./Feb. 2007; pp. 22-30.

Gerald Ttesauro; "Online Resource Allocation Using Decompositional Reinforcement Learning;" In Proceedings of the 20th National Conference on Artificial Intelligence; 2005; vol. 2 (AAAI'05); Anthony Cohn (Ed.), vol. 2. AAAI Press; pp. 886-891.

Duggan et al.; "Applying reinforcement learning towards automating resource allocation and application scalability in the cloud;" May 30, 2012; Concurrency and Computation: Practice and Experience 25 (12), pp. 1-19.

Truck et al.; "From Data Center Resource Allocation to Control Theory and Back;" 2010 IEEE 3rd International Conference on Cloud Computing (CLOUD 2010) vol. 00 no. undefined, pp. 410-417.

Bodik et al.; "Statistical machine learning makes automatic control practical for internet datacenters;" In Proceedings of the 2009 conference on Hot topics in cloud computing (HotCloud'09); USENIX Association; Berkeley, CA; USA; pp. 1-5.

Bogojeska et al; "Classifying Server Behavior and Predicting Impact of Modernization Actions;" Proc. of the IFIP/IEEE 9th International Conference on Network and Service Management (CNSM); 2013; pp. 59-66.

Bogojeska et al; "Impact of HW and OS Type and Currency on Server Availability Derived From Problem Ticket Analysis;" Proc. of the IFIP/IEEE Network Operations and Management Symposium (NOMS); 2014; pp. 1-10.

Mnih et al. Playing Atari with deep reinforcement learning; Neural Information Processing Systems (NIPS) Deep Learning Work-shop; 2013; pp. 1-9.

Bogojeska et al.; "Analysis of Labor Efforts and Their Impact Factors to Solve Server incident in Data Centers;" Proc. of the 14th IEEE/ACM International Symposium on Cluster, Cloud and Grid Computing (CCGRID); 2014; pp. 424-433.

Mnih et al.; "Human-level control through deep reinforcement learning;" Research Letter; Feb. 26, 2015; Nature vol. 518; pp. 529-533.

Moffaert et al.; "Multi-objective reinforcement learning using sets of pareto dominating policies;" J. Mach. Learn. Res. 15, 1; Jan. 2014; 3483-3512.

Perez et al.; "Multiobjective reinforcement learning for responsive grids;" Journal of Grid Computing; Springer Verlag; 2010; 8:3, pp. 472-492.

Maxim Egorov; "Multi-Agent Deep Reinforcement Learning;" Sanford Unitversity; TR 2016; pp. 1-8.

Xu Wang; "Deep Reinforcement Learning;" Case Study with Standard RL Testing Domains, Master's Thesis, TU Eindhoven; 2016; pp. 1-39.

Tambet Matiisen; "Deep Reinforcement Learning With Neon;" Institute of Computer Science; University of Tartu; Dec. 19, 2015; https://neuro.cs.ut.ee/deep-reinforcement-learning-with-neon/; pp. 1-9.

* cited by examiner

DATA CENTER INCLUDING COGNITIVE AGENTS AND RELATED METHODS

BACKGROUND

The present invention relates to a data center, and more specifically, to reconfiguration of software defined infrastructure of the data center. Information technology (IT) and data center spending has surpassed nearly a trillion dollars a year, while worldwide IT spending is forecast to continually rise. Data centers may be considered to be at the center of current IT infrastructure, and storage, e.g., cloud storage, computing, and networking resources are treated as commodities. Accordingly, a goal of a data center management team may be to reduce the total cost of ownership (TCO). This means reducing or minimizing operational expenditure (OPEX), while obtaining the best of any capital expenditure (CAPEX). For enterprises in the modern IT era, agility and speed have become highly desirable to stay relatively competitive in an ever changing and demanding business environment. With the emergence of software defined environments (SDEs), applications are increasingly being decoupled from the infrastructure, infrastructure resources are increasingly becoming abstracted and managed more intelligently with policy and automation driving relatively quick fulfillment and problem resolution.

The term autonomic computing has been used to describe the self-managing system components such as storage units, desktop computers and servers as well as operating systems, middleware and business applications. However, the broader trend of policy-based automation and analytics based learning and management can be even furthered by applying cognitive technology to make the system learn and react for unforeseen situations.

SUMMARY

A data center may include software defined infrastructure in a computing environment. The data center may also include a computer readable medium having instructions which when executed by a processor cause the processor to implement a plurality of cognitive agents to perform adaptive deep reinforcement learning to reconfigure the software defined infrastructure based upon changes in the computing environment.

The computing environment may include a respective managed environment for each cognitive agent, and each cognitive agent may evaluate the respective managed environment and generate a proposed action to reconfigure the software defined infrastructure based on a respective current state and respective experience. Each cognitive agent may also evaluate the respective managed environment and generate the proposed action to reconfigure the software defined infrastructure based upon a model, and simulated experience, for example.

Each cognitive agent may also evaluate the respective managed environment and generate the proposed action to reconfigure the software defined infrastructure based upon a policy function optimization. The policy function optimization may be to reduce a total cost of ownership (TCO) of the data center, for example.

The changes in the computing environment may include at least one of new workloads being added, new resources being available, and new constraints. The software defined infrastructure may include storage resources, and computing resources, and the plurality of cognitive agents may include a storage cognitive agent and a computing cognitive agent. The software defined infrastructure may include network resources.

A method aspect is directed to a method of reconfiguring a software defined infrastructure in a computing environment for a data center. The method may include implementing a plurality of cognitive agents to perform adaptive deep reinforcement learning to reconfigure the software defined infrastructure based upon changes in the computing environment.

A computer readable medium aspect is directed to a computer readable medium for a data center that includes software defined infrastructure in a computing environment. The computer readable medium includes computer executable instructions that when executed by a processor cause the processor to perform operations. The operations may include implementing a plurality of cognitive agents to perform adaptive deep reinforcement learning to reconfigure the software defined infrastructure based upon changes in the computing environment.

DETAILED DESCRIPTION

Figure 1:
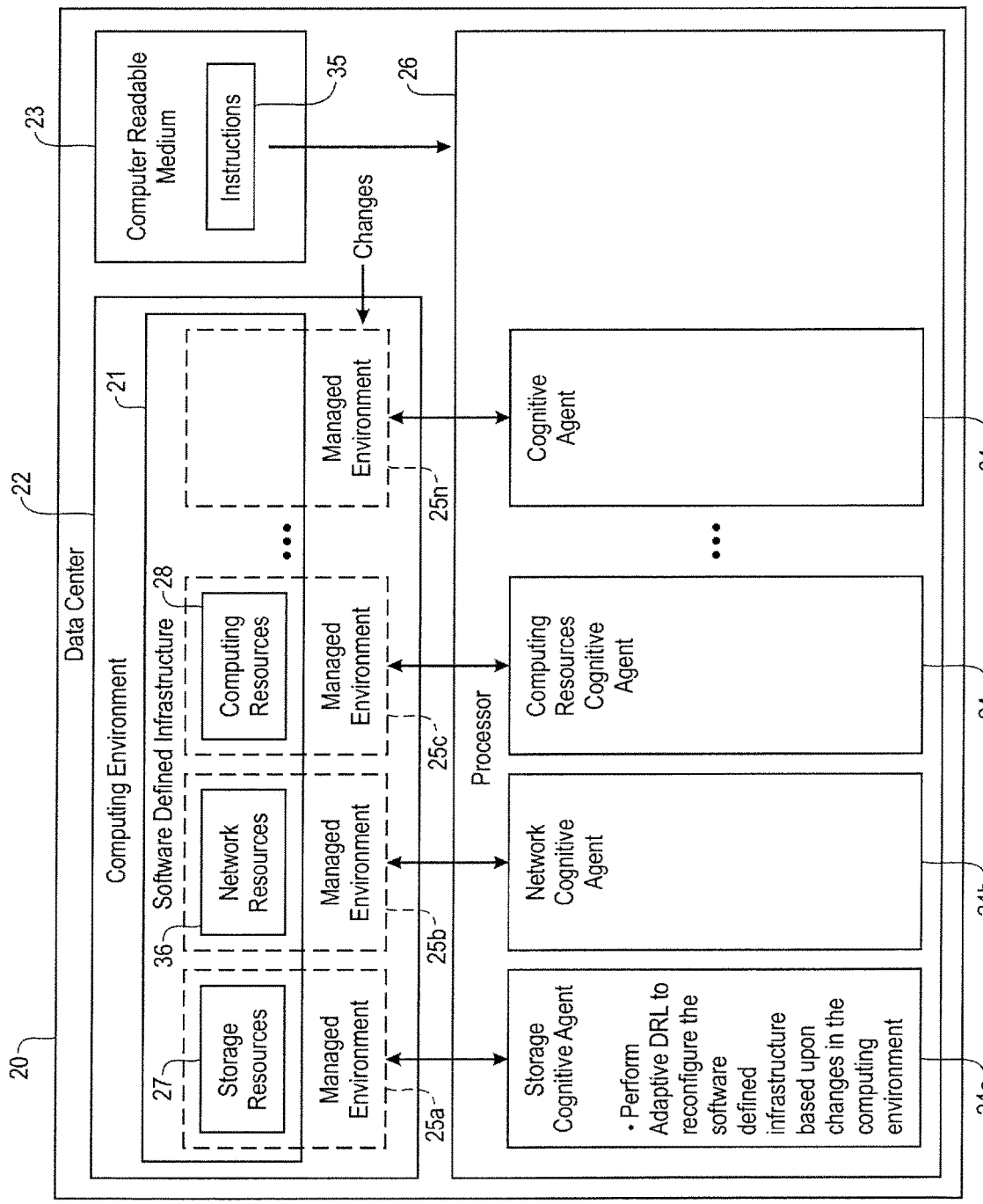
FIG. 1 is a schematic diagram of a data center in accordance with an embodiment.

Referring initially to FIG. 1, a data center 20 includes software defined infrastructure 21 in a computing environment 22. The software define infrastructure 21 may include network resources 36, for example. The software defined infrastructure 21 may include other and/or additional resources.

The computing environment 22 may include storage resources 27 and computing resources 28. The data center 20 also includes a computer readable medium 23 having instructions 35 which when executed by a processor 26 cause the processor to implement cognitive agents 24a-24n. The cognitive agents 24a-24n may be one or more of storage cognitive agents, network cognitive agents, and computing resource cognitive agents, for example, to correspond to the computing environment 22. The cognitive agents 24a-24n may be other types of cognitive agents, for example, to correspond to the resources in the computing environment 22. The computing environment 22 may include a respective managed environment 25a-25n for each cognitive agent 24a-24n.

The cognitive agents 24a-24n are implemented to perform adaptive deep reinforcement learning to reconfigure the software defined infrastructure 21 based upon changes in the computing environment 22. Changes in the computing environment 22 may include one or more of new workloads being added, new resources being available, and new constraints, for example.

Figure 2:
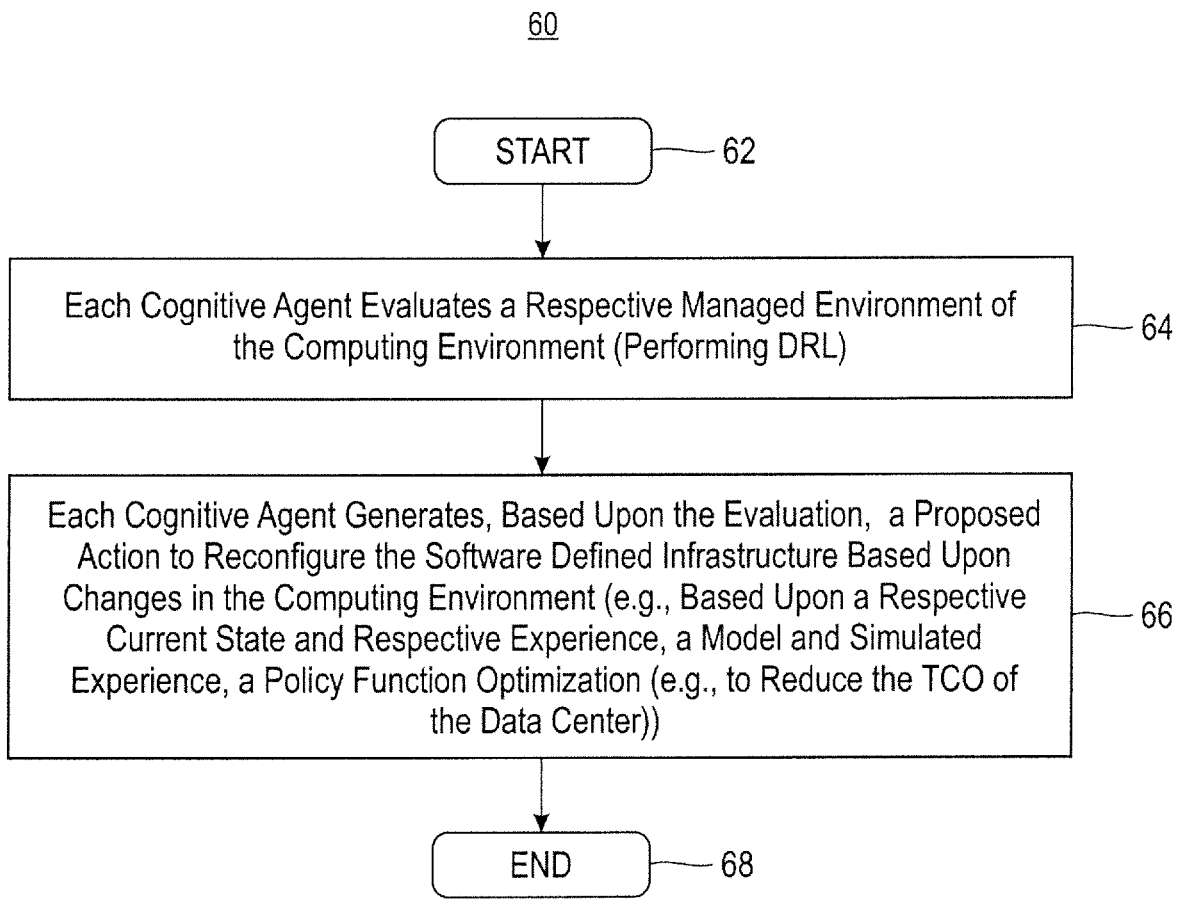
FIG. 2 is a flow diagram illustrating operation of cognitive agents of FIG. 1.

Referring now additionally to the flowchart 60 in FIG. 2, beginning at Block 62, operation of the cognitive agents 24a-24n will now be described. Each cognitive agent 24a-24n evaluates the respective managed environment 25a-25n (Block 64). Based upon the evaluation (Block 64), each cognitive agent 24a-24n generates a proposed action to reconfigure the software defined infrastructure 21 based on a respective current state and respective experience (Block 66). Each cognitive agent 24a-24n may also, based upon the evaluation (Block 64) generate the proposed action to reconfigure the software defined infrastructure 21 based upon a model and simulated experience. Each cognitive agent 24a-24n may further, based upon the evaluation (Block 64), generate the proposed action to reconfigure the software defined infrastructure 21 based upon a policy function optimization. The policy function may be for reducing a total cost of ownership (TCO) of the data center 20. The operations end at Block 68.

Figure 3:
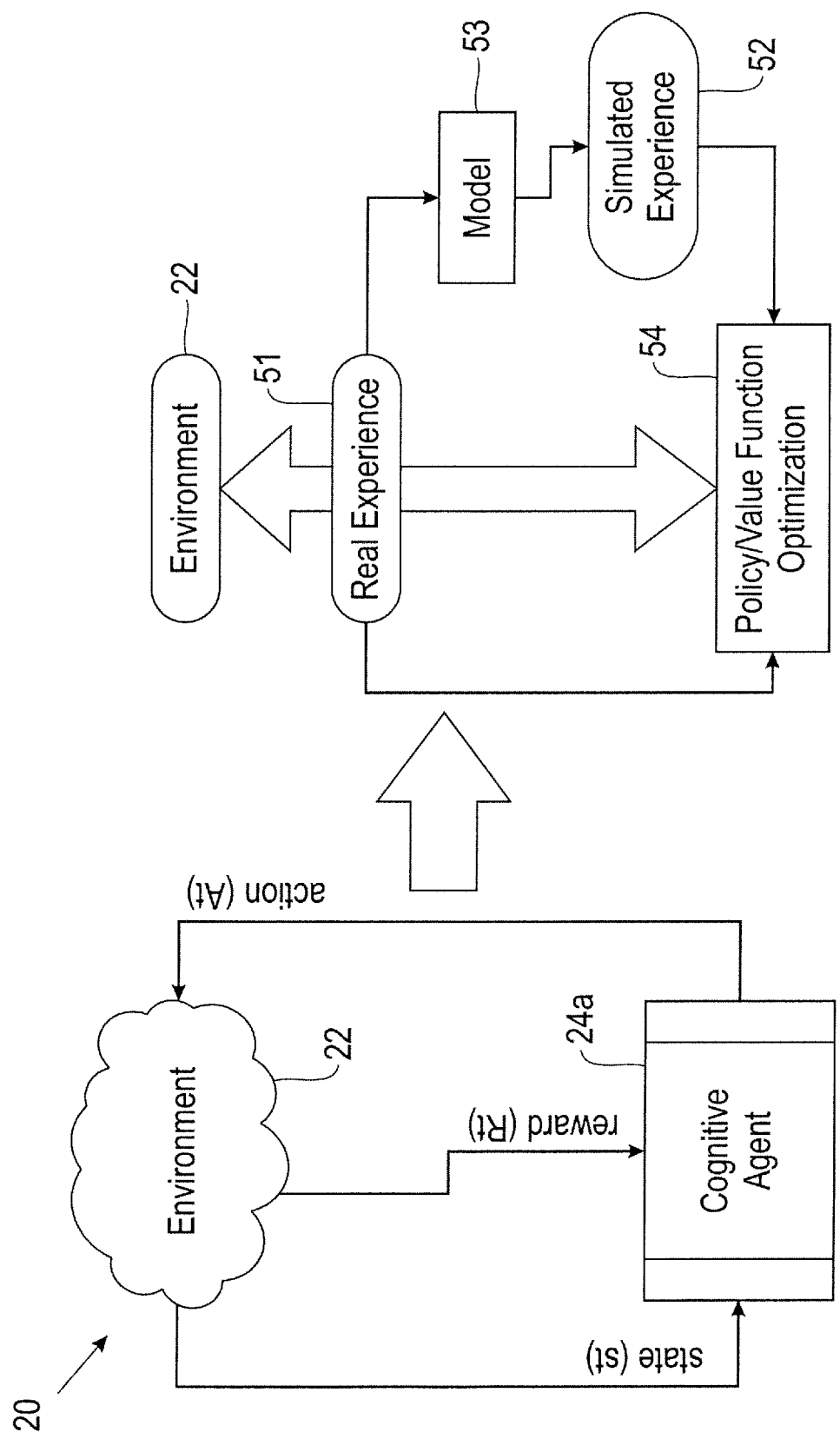
FIG. 3 is a schematic diagram of deep reinforcement learning with policy optimization for use with the data center in accordance with an embodiment.
Figure 4:
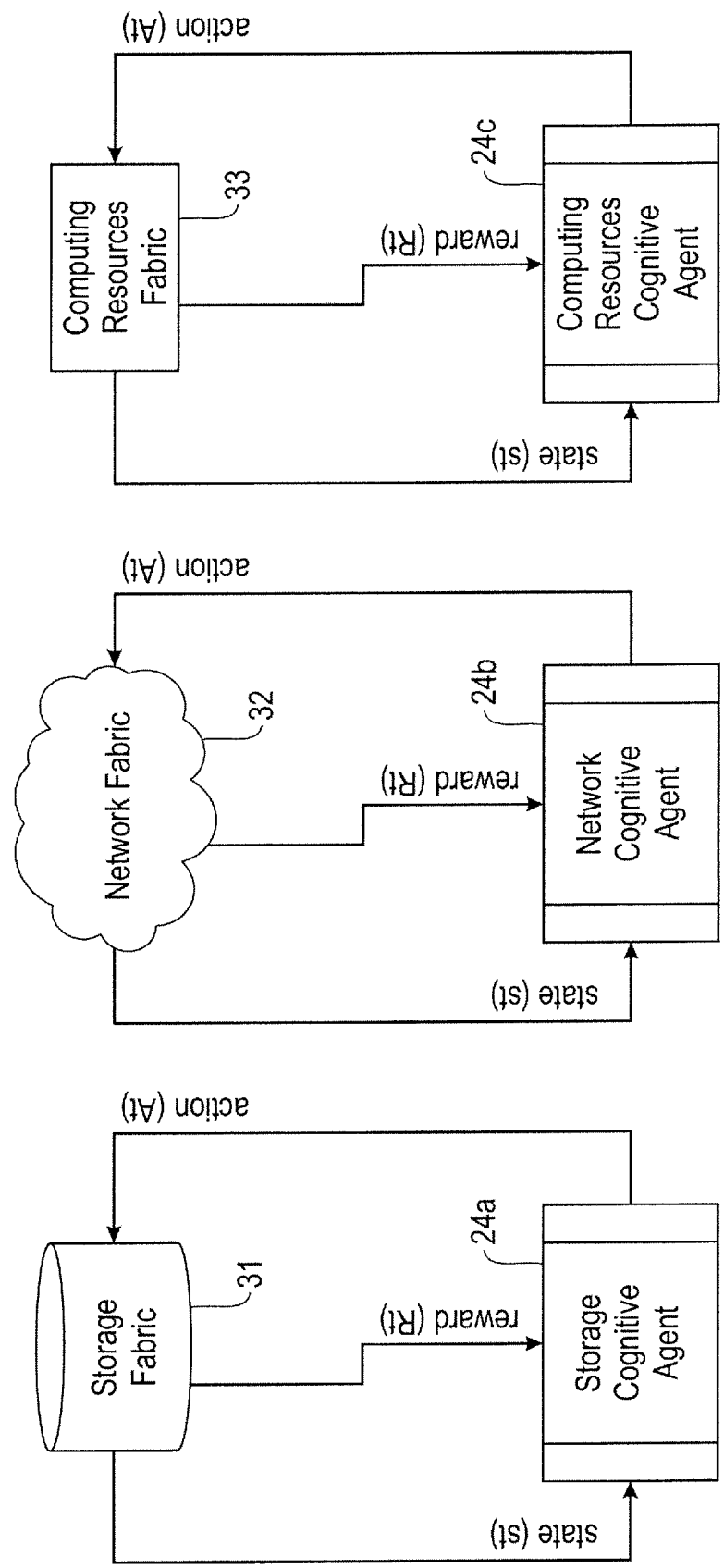
FIGS. 4A-4C are schematic diagrams of software defined infrastructure-as-a-service deep reinforcement learning cognitive agents in accordance with an embodiment.
Figure 5:
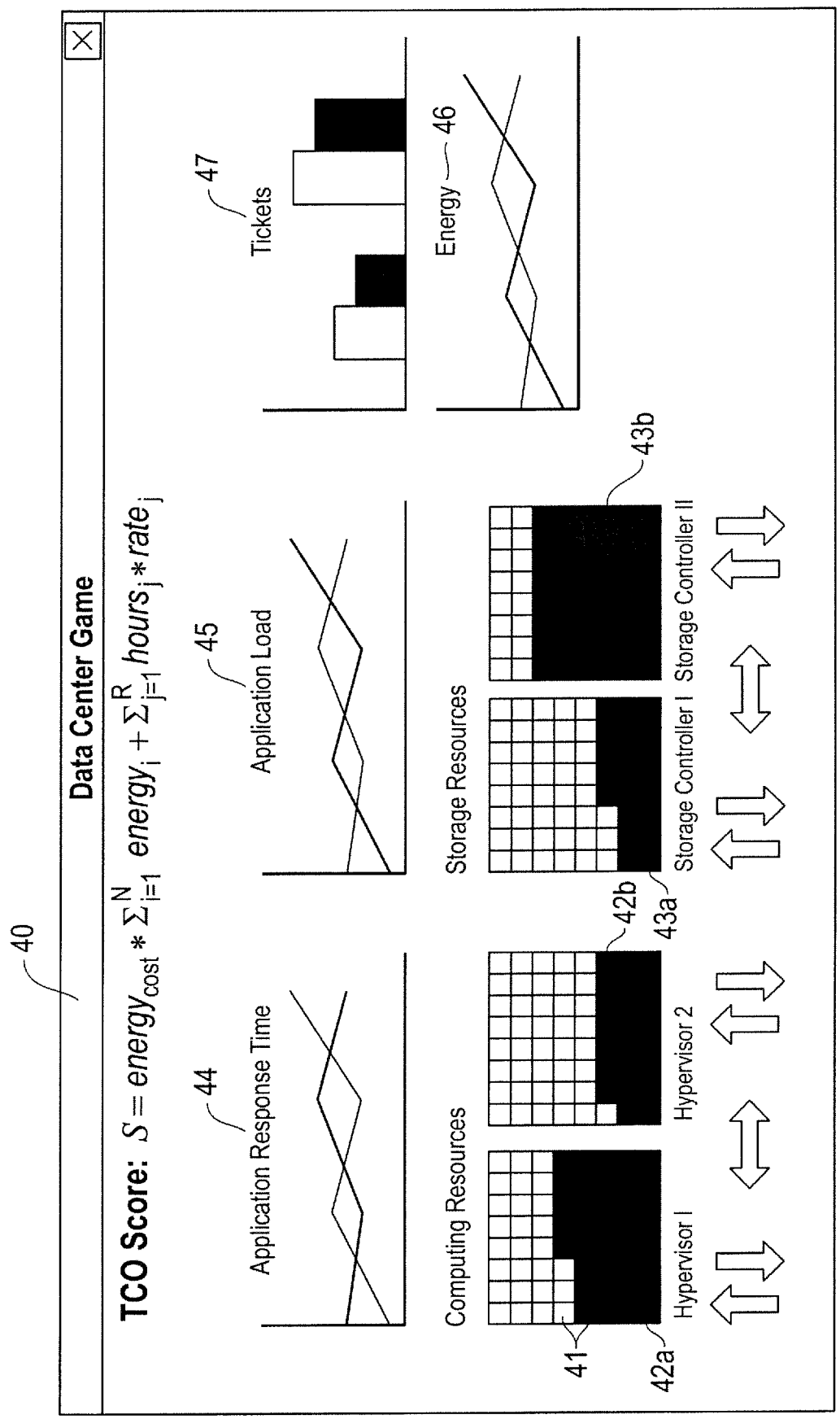
FIG. 5 is a schematic diagram of gamification of cognitive agents working toward optimizing the total cost of ownership in accordance with an embodiment.

Referring now additionally to FIGS. 3-5, further details of the data center 20 will now be described. As will be appreciated by those skilled in the art, current state of the art may provide an intelligent information technology (IT) service delivery by a robotic process automation (RPA) where pre-canned customizable steps are followed to achieve an end goal for a pre-defined and pre-encountered scenario, e.g. technical health check of a server. The current state of art also may provide an intelligent IT service delivery by learning of system behavior from historical data, predictive insights and creating actionable intelligence/insights. However, a current delivery mechanism does not address problem of handling a new unforeseen situation.

The system 20 described herein advantageously may provide cognitive IT service delivery that provides automation by learning in real-time and adapting to situations. This IT service delivery for on-premise and on-cloud platform may provide a relatively sophisticated artificial intelligence (AI) based tool set to manage and operate infrastructure, applications and managed services. The term "gaming the data center" may be used to refer to a similar scenario in the gaming realm where, for example, AI is capable of winning against humans in a game due to advances, for example, in the fields of AI and deep reinforcement learning (DRL).

The system described herein applies DRL to the data center 20, for example, treating it as a game, where the system reduces or minimizes total cost of ownership (TCO). As will be described in further detail below, several cognitive agents 24a-24n may be deployed where each agent controls different aspects of the data center 20 via software defined controls. Each cognitive agent 24a-24n may be responsible for evaluating its managed environment and proposing the best approach possible based on its current state and experience. Those skilled in the art will appreciate that the system moves away from rule based systems, while leveraging lessons learned from learning systems, and building a cognitive holistic solution, for example, and in a sense, building a brain for the data center 20, where the muscles are software defined environments 21 managed/controlled via standardized APIs (the muscles).

In other words, the system or data center 20 described herein, may be considered as taking lessons learned from traditional autonomic agents, which often relied on deep understandings of processes, high-level models, and/or derived rules from insights generated by analytics engines, and applies them to an evolved form of reasoning such as DRL, where policies are learned and optimized as the environment changes (FIG. 3). In other words, real experiences 51 or changes in the computing environment 22 are modeled based upon a model 53 to generate a simulated experience 52. The real experiences 51 and the simulated experiences 52 optimize a policy/value function 54 (FIG. 3). This may be considered extremely important as the agents should adapt to new workloads being added, new resources being available, as well as new constraints (e.g., energy caps, service level agreement (SLA) guarantees, etc.). To address this, the cognitive agents (e.g., DRL) 24a-24n learn to manage different components within a data center 20 via the application programming interfaces (APIs) of the software defined infrastructure 21 (SDI). The SDI APIs may permit the cognitive agents 24a-24n to have relatively full control of the computing environment 22. This also may permit development beyond what may be considered traditional machine-learning based recommendation engines, and realize true cognitive automated systems.

Referring to FIGS. 4A-4C three different cognitive agents 24a, 24b, 24c may be deployed, each managing different components within a data center's fabric, for example, storage fabric 31 (FIG. 4A), network fabric 32 (FIG. 4B), and computing resources fabric 33 (FIG. 4C). For example, different cognitive agents 24a-24n, to manage part of an ecosystem, would be deployed as each piece may have different goals, thus, the agent trains and learns in a different way. For example, if a cognitive agent 24a-24n is deployed in an environment using OpenStack, the APIs are different, and the system or computing environment 22 will behave differently, so the respective cognitive agent learns from interacting with OpenStack's APIs and tunes its parameters accordingly. The same cognitive agent 24a-24n could be deployed to interface with a different virtualization platform, and learn from different experiences, for example.

One example of a cognitive agent 24a-24n is an auto-scaling agent whose goal is to optimize the performance of an application (e.g., based on response time) as load increases by dynamically scaling the computing resources and storage fabrics 33, 31. Instead of relying on existing schemes by building on traditional feedback loops, the system maps the data center problem to a different domain, in particular, the gaming domain. The state of the data center 20 is mapped as a 2D image, where resource utilization, application response time, input/output (I/O) load, energy utilization, tickets in the system, etc. are encoded. The goal of the game is to reduce the TCO given by the following equation:

$$S = energy_{cost} \times \sum_{i=1}^{N} energy_i + \sum_{j=1}^{R} hours_j \times rate_j$$

Referring now additionally to FIG. 5, for example, the auto scaling scenario described above may be encoded as a 2D game 40, where the cognitive agent 24a-24n or auto-scaling agent working towards optimizing the TCO (by efficiently managing the storage/computing resources represented by 2D arrays of black/white pixels 41) is gamified. Resources, for example, computing resources 42a, 42b and storage resources 43a, 43b may be changed (e.g., added/removed) on demand. As application response time 44 increases due to load (e.g., application load 45), resources could be added to reduce response time.

In the present example, the energy 46 of the data center 20 increases as there is more load in the system. Energy 46 takes into account dynamic power as well as idle power over time and the cooling to reduce heat in the data center 20.

Similarly, the higher the response time 44 and the longer no action is taken, the higher the chances are of incurring tickets 47. Those skilled in the art will appreciate that tickets 47 translate to labor hours, which also affect the TCO. Thus, it is desirable that the cognitive agent 24a-24n find the optimal policy to reduce or minimize the TCO (the score of the system). The cognitive agent 24a-24n can adjust several parameters: add a resource, remove a resource, migrate/move a resource, or do nothing for two resource classes: storage and computing resources 42a, 42b, 43a, 43b.

Once the state of the data center 20 is encoded, a deep Q-Network, for example, may be used to approximate the Q-values of each cognitive agent 24a-24n in the system. These values are used to estimate the value of executing a given action, thereby transitioning states, as denoted in the following equation:

$$Q(s, a) = Q(s, a) + \alpha(r + \gamma \max_{a'} Q(s', a') - Q(s, a))$$

Those skilled in the art will appreciate that a convolutional neural network may be used to learn to play simple 2D games. In the present example, a data center problem is considered to be simplified as a 2D game 40, where positive/negative changes can be observed as the actions affect the environment. DRL has been shown to outperform games historically tackled by traditional resource learning. In the present example, the auto-scaling problem has been mapped into a simplified version of a game, where two resources (storage, and computing 42a, 42b, 43a, 43b) have been identified and able to be controlled via add, remove, migrate/move, and do nothing (no-op) actions. The application response time 44, number of tickets 47 and energy 46 represent the state of the data center 20, while the goal is to reduce or minimize the TCO score. If a ticket 47 is introduced, a negative reward may be obtained. If energy 46 increases and/or a response time 44 violates a service level agreement (SLA), the reward may also be reduced. Positive rewards may be provided for actions that lead to reduction in the overall TCO as well as tickets/energy/improvements in SLA. These positive/negative changes are formulated as obstacles in a game with SLA being one of the major obstacles to be penalized if violated. Another violation of an SLA, for example, would be running out of space or storage resources 43a, 43b, as this may be considered a violation of a hard limit. To accomplish this task, deep q-learning with experience replay is used.

TABLE 1

Sample Resource Mapping (Computing Resource Fabric)

| Virtual Machine (VM) Type | Size | Pixels |
| --- | --- | --- |
| VM.Small | 1 vCPU, 2GB RAM, 20GB Disk | 1 |
| VM.Medium | 2 vCPU, 8GB RAM, 50GB Disk | 2 |
| VM.Large | 4 vCPU, 16GB RAM, 200GB Disk | 4 |
| VM.X-Large | 4 vCPU, 32GB RAM, 500GB Disk | 8 |

TABLE 2

Sample Resource Mapping (Storage Fabric)

| Volume Type | Size (GB)/IOPS | Pixels |
| --- | --- | --- |
| Small Bronze | 100/0.5 | 1 |
| Medium Bronze | 200/0.5 | 2 |

TABLE 2-continued

Sample Resource Mapping (Storage Fabric)

| Volume Type | Size (GB)/IOPS | Pixels |
| --- | --- | --- |
| Large Bronze | 500/0.5 | 3 |
| X-Large Bronze | 1000/0.5 | 6 |
| Small Silver | 100/1 | 2 |
| Medium Silver | 200/1 | 3 |
| Large Silver | 500/1 | 4 |
| X-Large Silver | 1000/1 | 8 |
| Small Gold | 100/4 | 3 |
| Medium Gold | 200/4 | 4 |
| Large Gold | 500/4 | 8 |
| X-Large Gold | 100/4 | 10 |

Tables 1 and 2, above, show a sample mapping of resource types into pixels. In the present example, each action/policy that is learned dictate what action to do (e.g., add volume) as well as the resource type (e.g., Small Gold). This may directly affect the performance of the system. For example, I/O is observed to be relatively high, but storage demand is relatively low, a high-end storage volume may be targeted. Similarly, if the I/O load is relatively low, but application capacity is observed to be reaching capacity, the capacity may be increased by adding a slower volume type with higher capacity (e.g., Large Bronze). The benefit of applying deep learning to the problem of the data center 20 may be that of not relying on rules of thumb/policies created by experts in the field, as these experts may 1) not be able to analyze the workload in real-time, 2) the states of a data center can be very complex, which may not be captured by human created rules of thumb/policies, and 3) the data center team may not have an expert for a particular application within their ranks. This may advantageously permit a data center fabric manager to learn the optimal policy from experience.

The pixels 41 (FIG. 5) while illustratively fixed as gray-scale values (black/white), may be encoded with additional information per pixel. For example, more information per pixel, such as, the resource type, may be encoded into the pixel itself. Accordingly, the cognitive agent 24a-24n may learn which pixel and color reduces response time more efficiently to thereby obtain an improved TCO score. For example, the resource type, resource capacity, and load may be encoded into a red, green, blue (RGB) value as shown in Tables 3 and 4, below.

TABLE 3

Sample RGB Resource Mapping (Computing Resource Fabric)

| Volume Type | Size (GB)/IOPS | R | G | B |
| --- | --- | --- | --- | --- |
| VM.Small | 1 vCPU, 2GB RAM, 20GB Disk | 0 | 31 | 31 |
| VM.Medium | 2 vCPU, 8GB RAM, 50GB Disk | 0 | 63 | 63 |
| VM.Large | 4 vCPU, 16GB RAM, 200GB Disk | 0 | 127 | 127 |
| VM.X-Large | 4 vCPU, 32GB RAM, 500GB Disk | 0 | 255 | 255 |

TABLE 4

Sample RGB Resource Mapping (Storage Fabric)

| Volume Type | Size (GB)/IOPS | R | G | B |
| --- | --- | --- | --- | --- |
| Small Bronze | 100/0.5 | 127 | 31 | 31 |
| Medium Bronze | 200/0.5 | 127 | 63 | 63 |
| Large Bronze | 500/0.5 | 127 | 127 | 127 |
| X-Large Bronze | 1000/0.5 | 127 | 255 | 255 |

TABLE 4-continued

Sample RGB Resource Mapping (Storage Fabric)

| Volume Type | Size (GB)/IOPS | R | G | B |
|---|---|---|---|---|
| Small Silver | 100/1 | 127 | 31 | 31 |
| Medium Silver | 200/1 | 127 | 63 | 63 |
| Large Silver | 500/1 | 127 | 127 | 127 |
| X-Large Silver | 1000/1 | 127 | 255 | 255 |
| Small Gold | 100/4 | 127 | 31 | 31 |
| Medium Gold | 200/4 | 127 | 63 | 63 |
| Large Gold | 500/4 | 127 | 127 | 127 |
| X-Large Gold | 100/4 | 127 | 255 | 255 |

Similarly, the SLA of the system may be modeled as a color coded region, where pixel values encode the response time of the system, for example, good corresponds to green, while bad corresponds to red. For example, as long the quality of service (QoS)/response time is sub-millisecond (less than 1 ms), the SLA bar may remain green. However, when the QoS/response time begins to reach 1 ms, like a heat map, the SLA bar starts getting warmer (e.g., yellow), and as it starts passing the 1 ms mark, it approaches red. At the point where the SLA bar approaches red, the cognitive agent 24a-24n starts adding resources with higher RGB values (e.g., more capacity/higher performance VMs) to service the demand. Similarly, when load is low, there is chance that some of the VMs are to be shutdown since the cognitive agent 24a-24n adapts to the load, ideally the cognitive agent will know, from experience, how many VMs it should turn off.

With respect to a target architecture, the number of layers/convolutional levels may be tunable as desired to fit to each cognitive agent 24a-24n. For the data center 20 described herein, the last layer has a total of two resource types, with four actions each (eight end action/policies), which allow the best Q-values to be found. Those skilled in the art will appreciate that the deep-q learning algorithm disclosed by V. Mnih et al., in the technical article entitled, "Human-level Control Through Deep Reinforcement Learning" may be implemented for determining the best Q-values.

Indeed while several implementations of a data center 20 have been described herein, those skilled in the art will appreciate that multiple DRL-based engines may be used with the goal of "gaming the data center," where a win corresponds to a TCO reduction. Moreover, as will be appreciated by those skilled in the art, autonomic computing may be considered the de-facto for data center management, where best practices are translated into policies, which are then enacted upon when certain criteria are met. The vision for autonomic computing may be considered as a computing environment with the ability to manage itself and dynamically adapt to change in accordance with business policies and objectives. For example, a storage system may trigger a warning when a disk is reaching 80% of its used capacity. Similarly, the computer plane might have a rule that says if the input/output (I/O) load for some workload reaches a threshold T, a new virtual machine may be generated to handle the I/O load. The problem is that all of these policies are based on best practices, which tend to take time to learn, not to mention, the expertise that may or may not be present when new workloads are deployed, or new resources are installed.

Traditional approaches would follow the MAPE model (monitor, analyze, plan, execute), where a simple control loop observes sensors readings, analyzes them, plans a course of action, and executes what may be considered the best plan. Such systems relied on models that are often relatively complex to build, and do not adapt well to variations/changes in the environment. An increased amount of engineering may be involved in the process and a lot of trial and error and analytics, which often translates to many hours of labor.

Reinforced learning has been studied in the past for resource management, resource allocation and scaling, and application management. Most of these models and related elements look at building agents that target very specific scenarios. This is due to the fact that any sort of reinforced learning should be an abstracted model, with a clear goal as the number of data it needs to train is significant. Part of reducing TCO is not just optimizing how resources are used, but also, what to do in case there are issues with the resources. Some approaches look at analyzing ticket information in data centers with the goal of reducing the hours to maintain a data center. These insights are quite useful to classify events and predict refresh cycles, for example. However, most of these insights could then become actionable events by adding the results of the analysis into a control loop similar to the MAPE model. However, any changes in the environment would generally affect how these insights are used and how policies are crafted.

Statistical machine learning based models have been used to build policies that may adapt to change in the environment, however, a lot of performance samplings and simulation cycles are used to reach some degree of stability for policies. As computing power becomes less expensive, building more complex approaches that mimic the way humans learn may become more feasible. The use of DRL, as in the present data center 20, may be particularly beneficial for its ability to adapt to change in environments.

A method aspect is directed to a method of reconfiguring a software defined infrastructure 21 in a computing environment 22 for a data center 20. The method includes implementing a plurality of cognitive agents 24a-24n to perform adaptive deep reinforcement learning to reconfigure the software defined infrastructure 21 based upon changes in the computing environment 22.

A computer readable medium aspect is directed to a computer readable medium 23 for a data center 20 that includes software defined infrastructure 21 in a computing environment 22. The computer readable medium includes computer executable instructions 35 that when executed by a processor 26 cause the processor to perform operations. The operations include implementing a plurality of cognitive agents 24a-24n to perform adaptive deep reinforcement learning to reconfigure the software defined infrastructure 21 based upon changes in the computing environment 22.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data center comprising:
   software defined infrastructure in a computing environment; and
   a computer readable medium having instructions which when executed by a processor cause the processor to:
   map, by the processor, a state of the data center in a data center domain as an image in a gaming domain, wherein the map comprises:
   for each type of resource included in the software defined infrastructure, representing the type of resource as one or more arrays of pixels of the image by encoding capacity and input/output (I/O) load of the type of resource into pixel values for the one or more arrays of pixels; and representing a service level agreement (SLA) of the computing environment as a color coded region of the image by encoding application response time of the computing environment into pixel values for the color coded region; and implement, by the processor, a plurality of cognitive agents to perform adaptive deep reinforcement learning using the image to reconfigure the software defined infrastructure based upon changes in the computing environment that are represented by changes in pixel values of the image, wherein each cognitive agent of the plurality of cognitive agents trains and learns differently from one another, each cognitive agent of the plurality of cognitive agents evaluates a respective managed environment and respective different components within the data center based on different application programming interfaces of the software defined infrastructure, and each cognitive agent is configured to add, remove, and migrate a resource;

wherein the pixel values for the color coded region change from green values to red values in response to the application response time of the computing environment increasing, each cognitive agent is configured to add one or more resources in response to the pixel values for the color coded region changing to red values, and capacity and I/O load of the one or more resources added are encoded into higher red, green, and blue values than other pixel values of the one or more arrays of pixels.

2. The data center of claim 1, wherein:
the map further comprises encoding resource utilization, energy utilization and data center tickets;
the computing environment comprises a respective managed environment for each cognitive agent; each cognitive agent evaluates the respective managed environment and generates a proposed action to reconfigure the software defined infrastructure based on a respective current state and respective experience; and
a deep Q-network approximates Q-values for each of the plurality of cognitive agents.

3. The data center of claim 2, wherein each cognitive agent further evaluates the respective managed environment and generates the proposed action to reconfigure the software defined infrastructure based upon a model and simulated experience.

4. The data center of claim 3, wherein each cognitive agent further evaluates the respective managed environment and generates the proposed action to reconfigure the software defined infrastructure based upon a policy function optimization based on energy cost, total energy use, labor time and labor rate, and the pixel values for the one or more arrays of pixels comprise black and white values or red, green and blue values.

5. The data center of claim 4, wherein the policy function optimization reduces a total cost of ownership (TCO) of the data center, at least one cognitive agent determines which pixel values reduces the application response time of the computing environment efficiently for improving a TCO score, energy use is based on: dynamic and idle power usage over time in the data center, and power usage for cooling to reduce heat in the data center, increases in response time and energy usage that violate the SLA result in a negative reward in the gaming domain, and actions that lead to a reduction in the TCO score result in a positive reward in the gaming domain.

6. The data center of claim 1, wherein the changes in the computing environment comprise at least one of new workloads being added, new resources being available, or new constraints, and each cognitive agent of the plurality of cognitive agents is an auto-scaling agent that dynamically scales the respective different components within the data center within the respective managed environment.

7. The data center of claim 1, wherein:
the software defined infrastructure comprises one or more of the following types of resources: storage resources, computing resources, and network resources; and
the plurality of cognitive agents comprises a storage cognitive agent and a computing cognitive agent.

8. A server for a data center comprising software defined infrastructure in a computing environment, the server comprising:
a processor and a memory associated therewith, the processor configured to:
map a state of the data center in a data center domain as an image in a gaming domain, wherein the map comprises:
for each type of resource included in the software defined infrastructure, representing the type of resource as one or more arrays of pixels of the image by encoding capacity and input/output (I/O) load of the type of resource into pixel values for the one or more arrays of pixels; and
representing a service level agreement (SLA) of the computing environment as a color coded region of the image by encoding application response time of the computing environment into pixel values for the color coded region; and
implement a plurality of cognitive agents to perform adaptive deep reinforcement learning using the image to reconfigure the software defined infrastructure based upon changes in the computing environment that are represented by changes in pixel values of the image, wherein each cognitive agent of the plurality of cognitive agents trains and learns differently from one another, each cognitive agent of the plurality of cognitive agents evaluates a respective managed environment and respective different components within the data center based on different application programming interfaces of the software defined infrastructure, and each cognitive agent is configured to add, remove, and migrate a resources;
wherein the pixel values for the color coded region change from green values to red values in response to the application response time of the computing environment increasing, each cognitive agent is configured to add one or more resources in response to the pixel values for the color coded region changing to red values, and capacity and I/O load of the one or more resources added are encoded into higher red, green, and blue values than other pixel values of the one or more arrays of pixels.

9. The server of claim 8, wherein:
the map further comprises encoding resource utilization, energy utilization and data center tickets;
the computing environment comprises a respective managed environment for each cognitive agent;
each cognitive agent evaluates the respective managed environment and generates a proposed action to reconfigure the software defined infrastructure based on a respective current state and respective experience;
a deep Q-network approximates Q-values for each of the plurality of cognitive agents; and
each cognitive agent of the plurality of cognitive agents is an auto-scaling agent that dynamically scales the respective different components within the data center within the respective managed environment.

10. The server of claim 9, wherein each cognitive agent further evaluates the respective managed environment and generates the proposed action to reconfigure the software defined infrastructure based upon a model and simulated experience, increases in response time and energy usage that violate the SLA result in a negative reward in the gaming domain, and actions that lead to a reduction in a cost of ownership (TCO) score result in a positive reward in the gaming domain.

11. The server of claim 10, wherein each cognitive agent further evaluates the respective managed environment and generates the proposed action to reconfigure the software defined infrastructure based upon a policy function optimization based on energy cost, total energy use, labor time and labor rate, the pixel values for the one or more arrays of pixels comprise black and white values or red, green and blue values, the resource type, and energy use is based on: dynamic and idle power usage over time in the data center, and power usage for cooling to reduce heat in the data center.

12. A method of reconfiguring a software defined infrastructure in a computing environment for a data center, the method comprising:
mapping, by a processor, a state of the data center in a data center domain as an image in a gaming domain, wherein the mapping comprises:
for each type of resource included in the software defined infrastructure, representing the type of resource as one or more arrays of pixels of the image by encoding capacity and input/output (I/O) load of the type of resource into pixel values for the one or more arrays of pixels; and
representing a service level agreement (SLA) of the computing environment as a color coded region of the image by encoding application response time of the computing environment into pixel values for the color coded region; and
implementing, by the processor, a plurality of cognitive agents to perform adaptive deep reinforcement learning using the image to reconfigure the software defined infrastructure based upon changes in the computing environment that are represented by changes in pixel values of the image, wherein each cognitive agent of the plurality of cognitive agents trains and learns differently from one another, each cognitive agent of the plurality of cognitive agents evaluates a respective managed environment and respective different components within the data center based on different application programming interfaces of the software defined infrastructure, and each cognitive agent is configured to add, remove, and migrate a resource;
wherein the pixel values for the color coded region change from green values to red values in response to the application response time of the computing environment increasing, each cognitive agent is configured to add one or more resources in response to the pixel values for the color coded region changing to red values, and capacity and I/O load of the one or more resources added are encoded into higher red, green, and blue values than other pixel values of the one or more arrays of pixels.

13. The method of claim 12, wherein:
the mapping further comprises encoding resource utilization, energy utilization and data center tickets;
the computing environment comprises a respective managed environment for each cognitive agent;
each cognitive agent is implemented to evaluate the respective managed environment and generate a proposed action to reconfigure the software defined infrastructure based on a respective current state and respective experience; and
a deep Q-network approximates Q-values for each of the plurality of cognitive agents.

14. The method of claim 13, wherein each cognitive agent is implemented to further evaluate the respective managed environment and generate the proposed action to reconfigure the software defined infrastructure based upon a model and simulated experience, increases in response time and energy usage that violate the SLA result in a negative reward in the gaming domain, and actions that lead to a reduction in a cost of ownership (TCO) score result in a positive reward in the gaming domain.

15. The method of claim 14, wherein each cognitive agent is implemented to further evaluate the respective managed environment and generate the proposed action to reconfigure the software defined infrastructure based upon a policy function optimization based on energy cost, total energy use, labor time and labor rate, the pixel values for the one or more arrays of pixels comprise black and white values or red, green and blue values, the resource type, energy use is based on: dynamic and idle power usage over time in the data center, and power usage for cooling to reduce heat in the data center, and each cognitive agent of the plurality of cognitive agents is an auto-scaling agent that dynamically scales the respective different components within the data center within the respective managed environment.

16. A computer program product for a data center comprising software defined infrastructure in a computing environment, the computer program product comprising a computer readable storage medium having program instructions embodied therewith, the program instructions executable by a processor to cause the processor to:
map, by the processor, a state of the data center in a data center domain as an image in a gaming domain, wherein the map comprises:
for each type of resource included in the software defined infrastructure, representing the type of resource as one or more arrays of pixels of the image by encoding capacity and input/output (I/O) load of the type of resource into pixel values for the one or more arrays of pixels; and
representing a service level agreement (SLA) of the computing environment as a color coded region of the image by encoding application response time of the computing environment into pixel values for the color coded region; and
implement, by the processor, a plurality of cognitive agents to perform adaptive deep reinforcement learning using the image to reconfigure the software defined infrastructure based upon changes in the computing environment that are represented by changes in pixel values of the image, wherein each cognitive agent of the plurality of cognitive agents trains and learns differently from one another, each cognitive agent of the plurality of cognitive agents evaluates a respective managed environment and respective different components within the data center based on different application programming interfaces of the software defined infrastructure, and each cognitive agent is configured to add, remove, and migrate a resource;

wherein the pixel values for the color coded region change from green values to red values in response to the application response time of the computing environment increasing, each cognitive agent is configured to add one or more resources in response to the pixel values for the color coded region changing to red values, and capacity and I/O load of the one or more resources added are encoded into higher red, green, and blue values than other pixel values of the one or more arrays of pixels.

17. The computer program product of claim 16, wherein:

the map further comprises encoding resource utilization, energy utilization and data center tickets;

the computing environment comprises a respective managed environment for each cognitive agent;

the operations comprise implementing each cognitive agent to evaluate the respective managed environment and generate a proposed action to reconfigure the software defined infrastructure based on a respective current state and respective experience; and a deep Q-network approximates Q-values for each of the plurality of cognitive agents.

18. The computer program product of claim 17, wherein the operations comprise implementing each cognitive agent to further evaluate the respective managed environment and generate the proposed action to reconfigure the software defined infrastructure based upon a model and simulated experience, increases in response time and energy usage that violate the SLA result in a negative reward in the gaming domain, and actions that lead to a reduction in the TCO score result in a positive reward in the gaming domain.

19. The computer program product of claim 18, wherein the operations comprise implementing each cognitive agent to further evaluate the respective managed environment and generate the proposed action to reconfigure the software defined infrastructure based upon a policy function optimization based on energy cost, total energy use, labor time and labor rate, the pixel values for the one or more arrays of pixels comprise black and white values or red, green and blue values, the resource type, energy use is based on: dynamic and idle power usage over time in the data center, and power usage for cooling to reduce heat in the data center, and each cognitive agent of the plurality of cognitive agents is an auto-scaling agent that dynamically scales the respective different components within the data center within the respective managed environment.

* * * * *